T. VARNEY.
TROLLEY.
APPLICATION FILED NOV. 8, 1907.
932,654.
Patented Aug. 31, 1909.
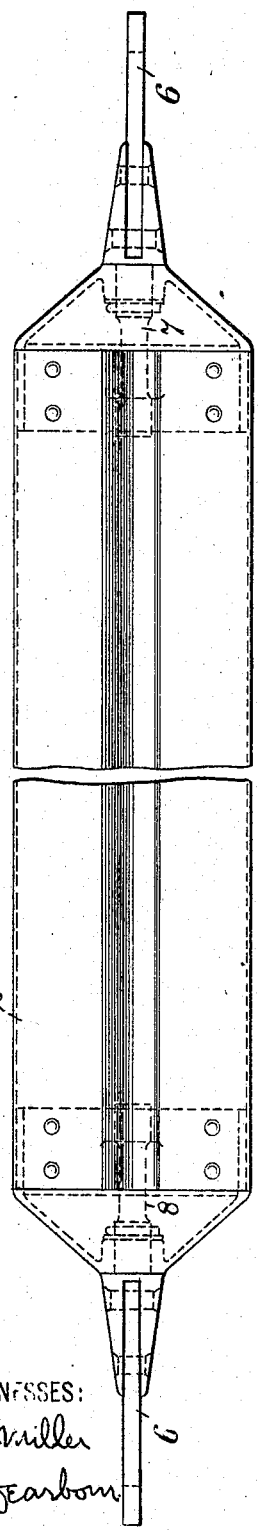
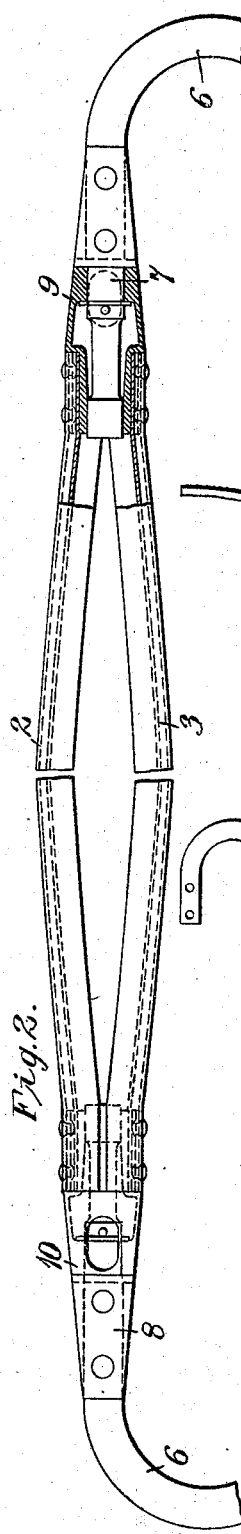
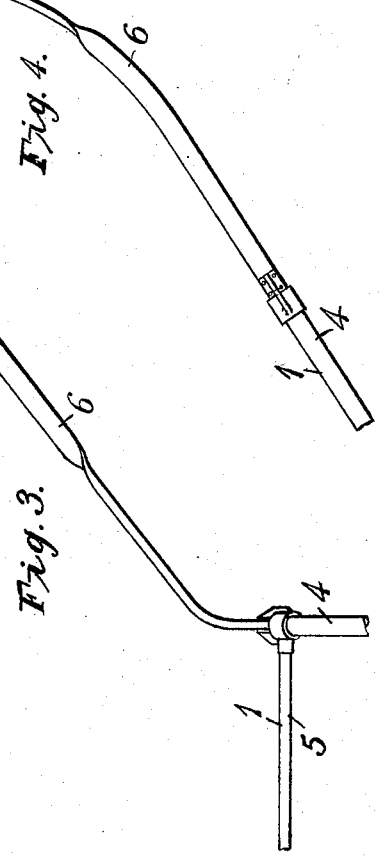
WITNESSES:
Fred H. Miller
R. J. Dearborn
INVENTOR
Theodore Varney
BY
Wesley G. Carr
ATTORNEY

UNITED STATES PATENT OFFICE.

THEODORE VARNEY, OF PITTSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

TROLLEY.

932,654.      Specification of Letters Patent.      Patented Aug. 31, 1909.

Application filed November 8, 1907. Serial No. 401,270.

*To all whom it may concern:*

Be it known that I, THEODORE VARNEY, a citizen of the United States, and a resident of Pittsburg, in the county of Allegheny and State of Pennsylvania, have invented a new and useful Improvement in Trolleys, of which the following is a specification.

My invention relates to circuit-collecting devices for electric vehicles, and it has for its object to provide a trolley of the sliding or bow type that shall be adapted to operate at high speeds without danger of becoming disengaged from its supply conductor.

The trolley of my present invention is not restricted in its use to any particular type of vehicles, but its construction is such that it may be advantageously employed on railway vehicles of small or moderate size and length so that the vehicle attendant may reverse the trolley without difficulty, as wheel trolleys are reversed.

My invention is illustrated in the accompanying drawings, in which—

Figure 1 is a plan view, and Fig. 2 is a view partially in side elevation and partially in section of a trolley constructed in accordance therewith. Figs. 3 and 4 are detail views of the outer extremity of the trolley-supporting frame.

Referring to the drawings, the device illustrated comprises a supporting frame 1 (only the upper part of which is illustrated) and contact shoes 2 and 3. The frame 1 corresponds to the pole on the ordinary wheel trolley and may be provided with any suitable form of trolley harp for holding the contact member in engagement with the supply conductor. The frame comprises parallel side bars 4 that are joined at their outer ends by a cross bar 5 and resilient curved extremities 6 which extend outwardly and then are bent sharply toward each other into alinement, as shown in Fig. 3. The extremities 6 are also bent out of the plane of the frame, as shown in Fig. 4, and are preferably constructed of tool steel so that the contact shoe may be held in engagement with its supply conductor irrespective of the irregularities in the line suspension and the speed of the vehicle. The alining ends of the frame extremities 6 are provided with shaft projections 7 and 8 on which bearing blocks 9 and 10 are rotatably mounted the fit between the said parts being such as to normally hold them in non-rotative relation.

The contact shoes 2 and 3 are in the form of resilient bow plates that are assembled with their convex faces outward and are secured, at their ends, to the bearing blocks 9 and 10. The shoes being so mounted as to be capable of rotative movement under pressure, they may be used interchangeably to materially increase the life of the contact member, as a whole.

While I have illustrated and described a specific device, I desire that variations in size and arrangement of parts which do not depart from the spirit of my invention shall be included within its scope.

I claim as my invention:

1. A trolley comprising a supporting frame and a pair of resilient bow contact shoes assembled with their bow faces outward and rotatively adjustable relative to the frame.

2. A trolley comprising a supporting frame having its outer ends bent inwardly into alinement with each other, bearing blocks rotatively adjustable on the alining ends of the frame, and a pair of oppositely disposed resilient bow contact shoes secured to the bearing blocks.

3. A trolley comprising a supporting frame having a resilient outer extremity, bearing blocks rotatively adjustable on the ends of the frame, and a plurality of angularly disposed sliding contact shoes attached to said bearing blocks.

4. A trolley comprising a supporting frame having a resilient outer extremity the ends of which are bent inwardly into alinement with each other, bearing blocks rotatively adjustable on the alining ends of the frame, and a pair of oppositely disposed resilient bow contact shoes secured to said bearing blocks.

In testimony whereof, I have hereunto subscribed my name this 30th day of Oct., 1907.

THEODORE VARNEY.

Witnesses:
    E. ERNEST ROSE,
    BIRNEY HINES.